US012014008B2

(12) United States Patent
Irie et al.

(10) Patent No.: US 12,014,008 B2
(45) Date of Patent: Jun. 18, 2024

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Atsushi Irie, Kanagawa (JP); Natsuko Ozaki, Kanagawa (JP); Satoshi Ozaki, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 17 days.

(21) Appl. No.: 17/760,617

(22) PCT Filed: Jul. 13, 2020

(86) PCT No.: PCT/JP2020/027201
§ 371 (c)(1),
(2) Date: Mar. 15, 2022

(87) PCT Pub. No.: WO2021/075102
PCT Pub. Date: Apr. 22, 2021

(65) Prior Publication Data
US 2022/0334674 A1    Oct. 20, 2022

(30) Foreign Application Priority Data
Oct. 17, 2019   (JP) .................................. 2019-190029

(51) Int. Cl.
*G06F 3/042*   (2006.01)
*G06F 3/01*    (2006.01)

(52) U.S. Cl.
CPC ............ *G06F 3/0425* (2013.01); *G06F 3/011* (2013.01)

(58) Field of Classification Search
CPC ........ G06F 3/0425; G06F 3/011; G06F 3/017; G06F 3/0416; G06F 2203/04101
See application file for complete search history.

(56) References Cited

U.S. PATENT DOCUMENTS

| 8,515,128 | B1 * | 8/2013 | Hildreth | G06F 3/0421 |
| | | | | 382/103 |
| 8,845,110 | B1 * | 9/2014 | Worley, III | G03B 17/54 |
| | | | | 348/136 |
| 11,790,642 | B2 * | 10/2023 | Kampel | G06V 20/64 |
| | | | | 382/156 |

(Continued)

FOREIGN PATENT DOCUMENTS

| JP | 2000-251078 A | 9/2000 |
| JP | 2000251078 A * | 9/2000 |

(Continued)

*Primary Examiner* — Benyam Ketema
(74) *Attorney, Agent, or Firm* — Paratus Law Group, PLLC

(57) ABSTRACT

An information processing apparatus according to an embodiment of the present technology includes: a selection unit. The selection unit selects, on the basis of a difference between first position information detected by a ranging sensor with respect to a target portion included in a body and second position information estimated by machine learning with respect to the target portion, the first position information or the second position information. As a result, it is possible to recognize the target portion with high accuracy.

20 Claims, 11 Drawing Sheets

(56) References Cited

U.S. PATENT DOCUMENTS

| | | | |
|---|---|---|---|
| 2014/0015861 A1* | 1/2014 | Takemoto | G06T 11/60 345/641 |
| 2014/0078490 A1* | 3/2014 | Higo | G01B 11/25 356/4.01 |
| 2014/0294233 A1* | 10/2014 | Osamura | G06T 7/593 382/103 |
| 2014/0313122 A1* | 10/2014 | Tang | G06F 3/017 345/156 |
| 2015/0185850 A1* | 7/2015 | Guilak | G06F 3/017 345/156 |
| 2015/0286341 A1* | 10/2015 | Khuri-Yakub | G06F 3/0436 345/177 |
| 2015/0317037 A1* | 11/2015 | Suzuki | G06F 3/0425 345/175 |
| 2017/0102784 A1* | 4/2017 | Ano | G06F 3/0425 |
| 2018/0180716 A1* | 6/2018 | McVittie | G06F 3/0423 |
| 2018/0180717 A1* | 6/2018 | Viswanathan | G01S 17/88 |
| 2018/0181259 A1* | 6/2018 | Morarity | G06F 3/0418 |
| 2019/0220685 A1* | 7/2019 | Uchiyama | G06V 40/10 |
| 2019/0221041 A1* | 7/2019 | Lin | G06T 7/55 |
| 2020/0074679 A1* | 3/2020 | Masui | G06T 7/75 |
| 2020/0117952 A1* | 4/2020 | Carroll | G06V 20/52 |
| 2020/0167005 A1* | 5/2020 | Maruyama | G02B 27/017 |
| 2020/0265633 A1* | 8/2020 | Okutani | G06F 3/012 |
| 2020/0273432 A1* | 8/2020 | Kobayashi | G09G 5/38 |
| 2021/0073572 A1* | 3/2021 | Cowburn | H04L 51/222 |
| 2021/0082564 A1* | 3/2021 | Colachis | G16H 20/30 |
| 2021/0223864 A1* | 7/2021 | Forsland | G06F 1/163 |
| 2021/0232269 A1* | 7/2021 | Sasaki | G06F 3/0446 |
| 2021/0326586 A1* | 10/2021 | Sorci | A61B 5/746 |
| 2022/0100341 A1* | 3/2022 | Seyed Mousavi | G06N 3/04 |
| 2022/0395193 A1* | 12/2022 | Yoshida | A61B 5/1072 |
| 2023/0024982 A1* | 1/2023 | Kalwani | H04L 67/303 |
| 2023/0033151 A1* | 2/2023 | Her | G03B 21/145 |

FOREIGN PATENT DOCUMENTS

| | | | | |
|---|---|---|---|---|
| JP | 2017-157034 A | | 9/2017 | |
| JP | 2017-191576 A | | 10/2017 | |
| JP | 2017191576 A | * | 10/2017 | |
| WO | WO 2018/083910 A1 | | 5/2018 | |
| WO | WO-2018083910 A1 | * | 5/2018 | G06F 16/50 |
| WO | WO-2018207351 A1 | * | 11/2018 | G06K 9/00369 |
| WO | WO 2018/230645 A1 | | 12/2018 | |
| WO | WO-2018230645 A1 | * | 12/2018 | G01M 99/00 |

* cited by examiner

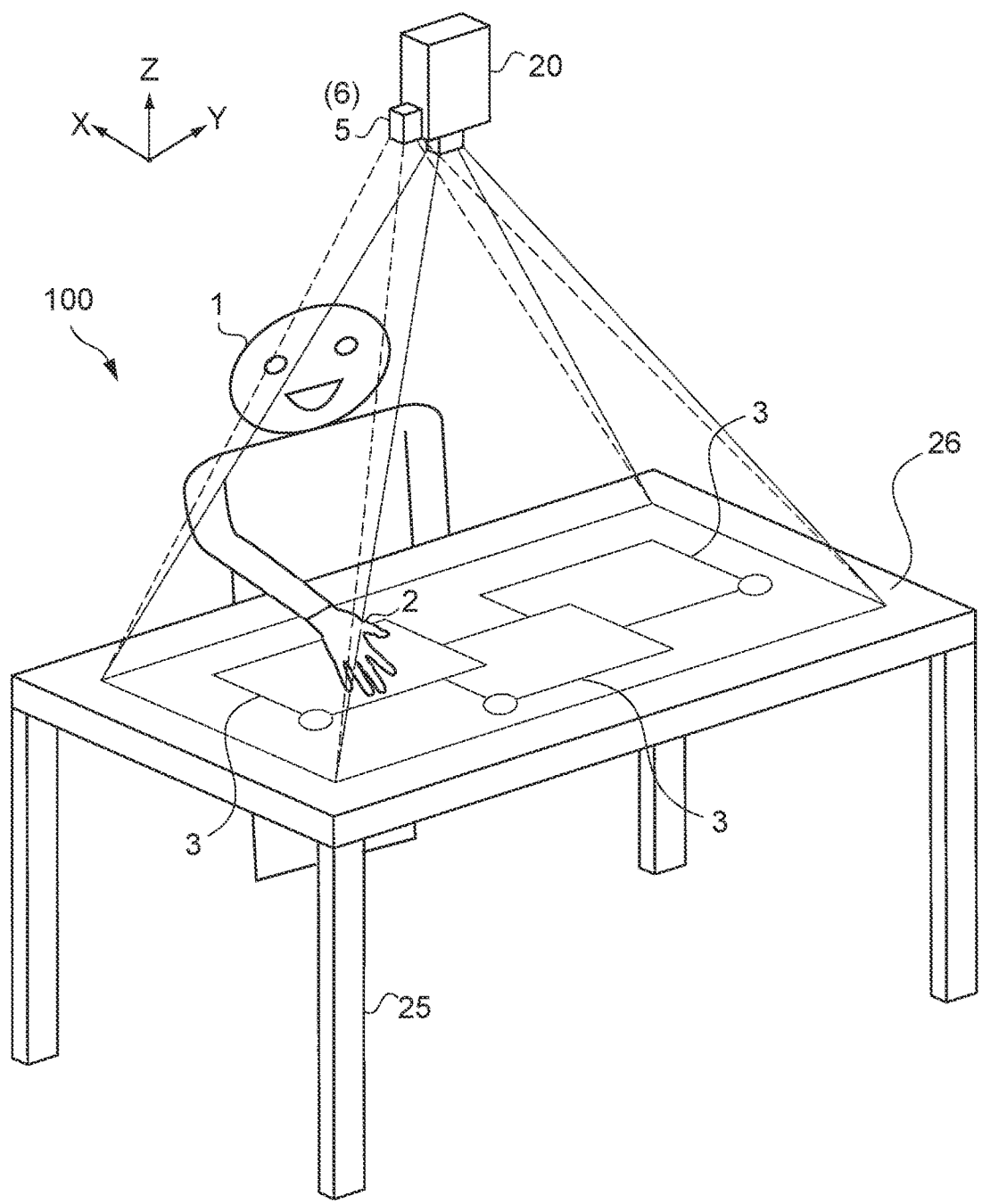
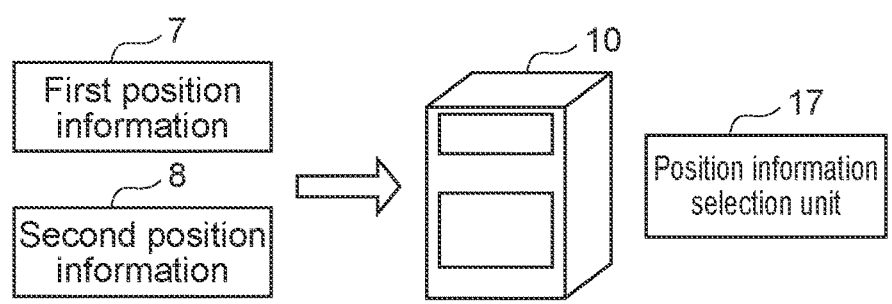
FIG.1

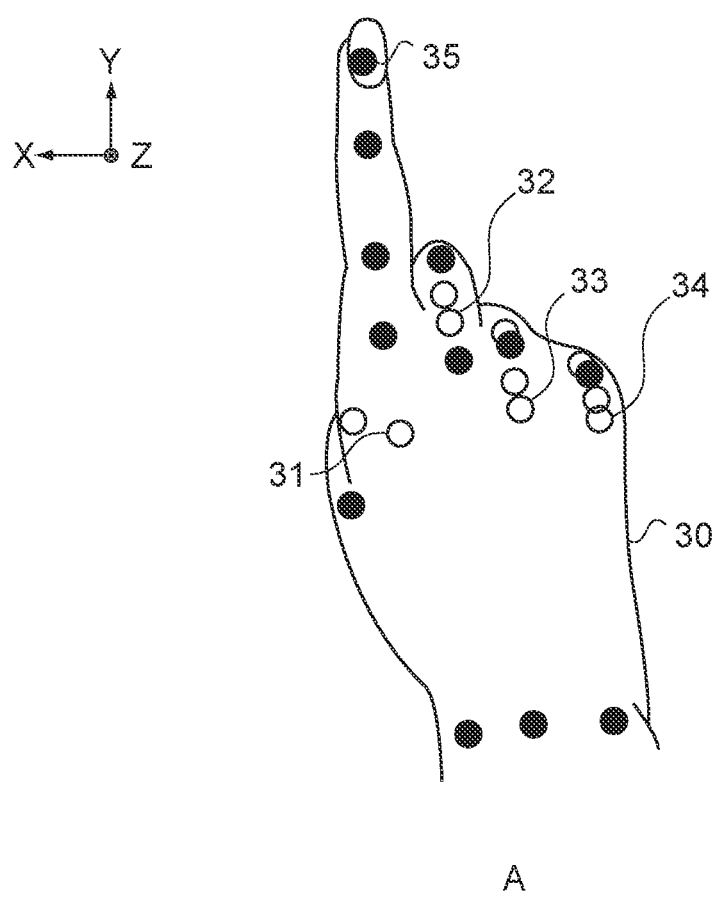
A
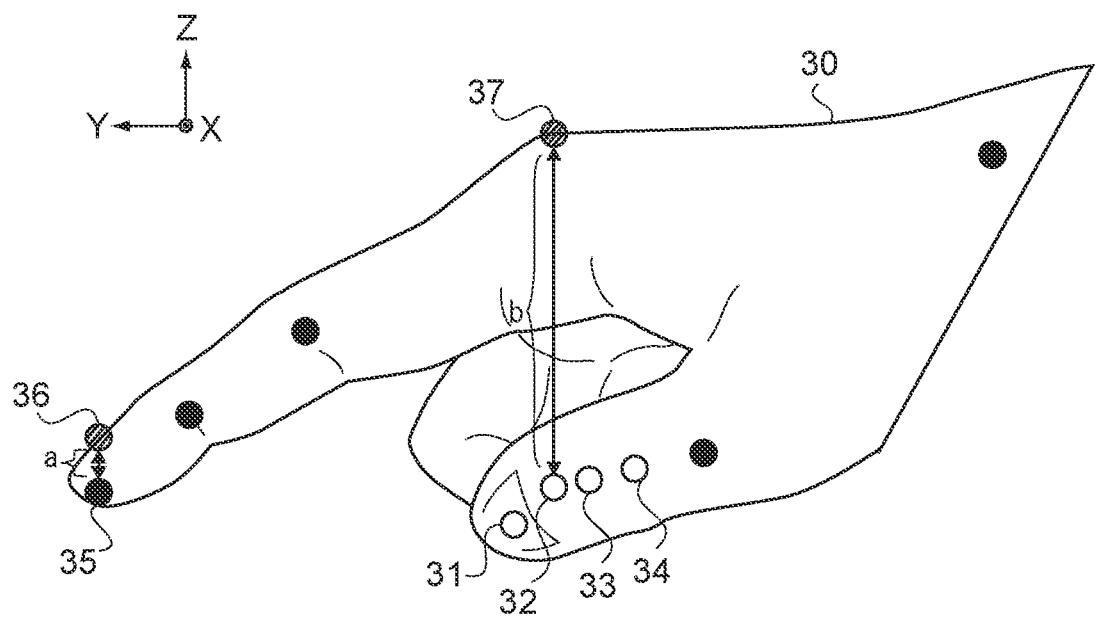
B
FIG.4

| Determination criterion | Determination result |
|---|---|
| \|Machine learning estimation value − value of ranging sensor\| ≤ t | Select first position information and then determine that it is not hidden |
| \|Machine learning estimation value − value of ranging sensor\| > t | Select second position information and then determine that it is hidden |
| Machine learning estimation value > value of ranging sensor and \|Machine learning estimation value − value of ranging sensor\| > t | Select second position information and then determine that it is hidden |
| Machine learning estimation value < value of ranging sensor and \|Machine learning estimation value − value of ranging sensor\| > t | Select second position information and then determine that it is not hidden |

FIG.5

| Determination criterion | Determination result |
|---|---|
| Feature points of thumb and index finger are hidden | Shape designated in advance or keep past state |
| Feature points of joint and hand center are hidden | Holding object |
| Predetermined feature point is hidden | Holding object |
| Object is recognized and feature points of joint and hand center are hidden | Holding object |
| Object is recognized and predetermined feature point is hidden | Holding object |
| There is hidden feature point | Not perform various inputs of finger corresponding to hidden feature point |
| Feature point of designated finger is hidden | Determine as shape corresponding to hidden finger |

FIG.7

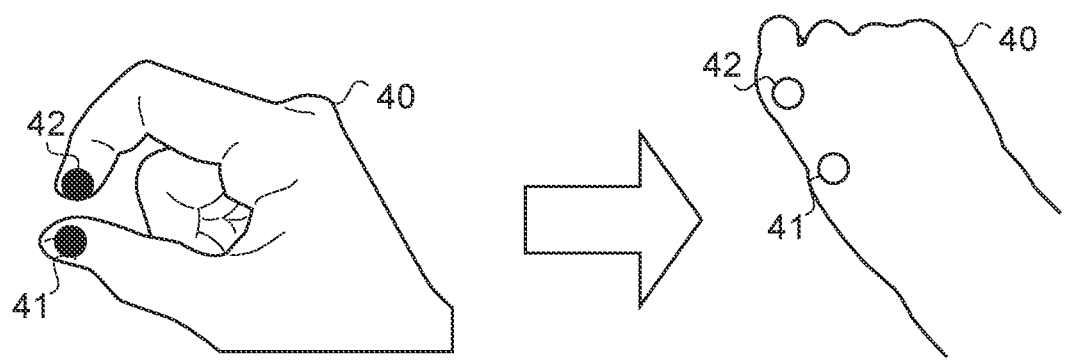
A
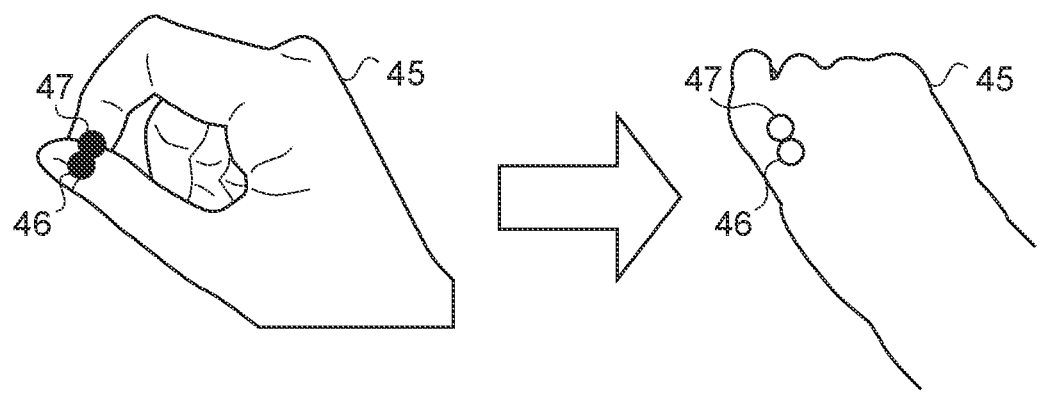
B
FIG.8

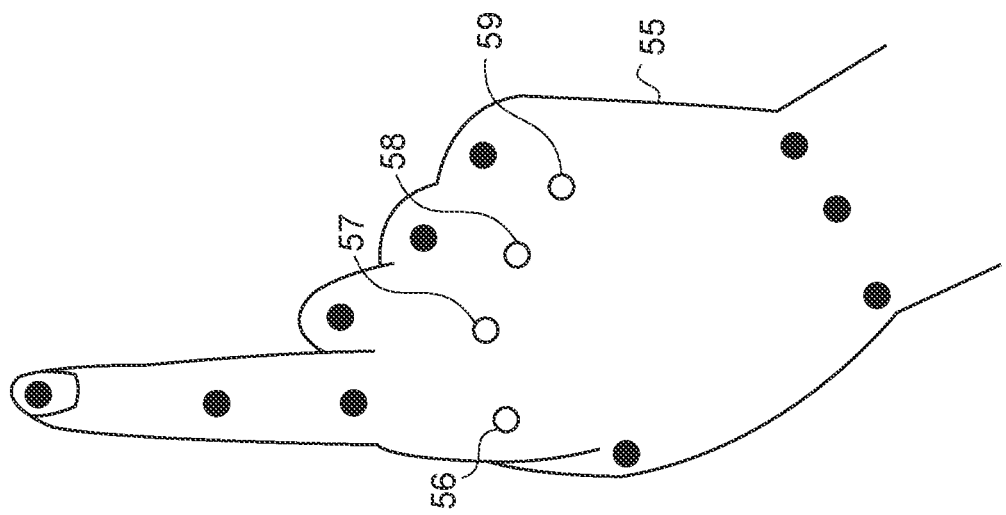
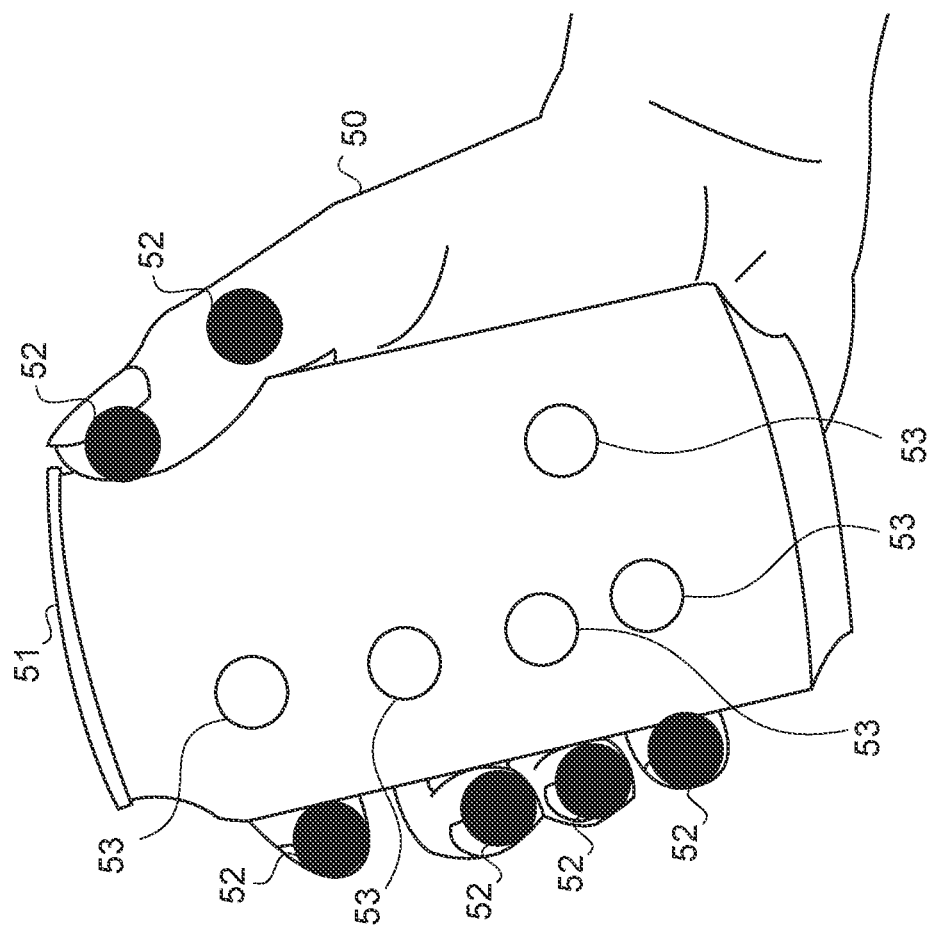
FIG.9

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2020/027201 (filed on Jul. 13, 2020) under 35 U.S.C. § 371, which claims priority to Japanese Patent Application No. 2019-190029 (filed on Oct. 17, 2019), which are all hereby incorporated by reference in their entirety.

TECHNICAL FIELD

The present technology relates to an information processing apparatus, an information processing method, and a program that can be applied to recognition of an object, and the like.

BACKGROUND ART

In the information processing apparatus described in Patent Literature 1, a probability map showing the probability of existence of a point of interest in a plurality of projection directions is estimated from a captured image of a hand. The three-dimensional position of the point of interest is specified on the basis of the probability map. For example, the three-dimensional position of the point of interest such as a fingertip and a joint is specified on the basis of the probability map in the x-direction, the probability map in the y direction, and the probability map in the z direction. As a result, it is possible to estimate the three-dimensional position of the point of interest with high accuracy (paragraphs and [0046], FIG. 2, and the like of Patent Literature 1).

CITATION LIST

Patent Literature

Patent Literature 1: WO 2018/083910

DISCLOSURE OF INVENTION

Technical Problem

As described above, a technology making it possible to recognize an object such as a hand with high accuracy is desired.

In view of the circumstances as described above, it is an object of the present technology to provide an information processing apparatus, an information processing method, and a program that are capable of recognizing a target portion with high accuracy.

Solution to Problem

In order to achieve the above-mentioned object, an information processing apparatus according to an embodiment of the present technology includes: a selection unit.

The selection unit selects, on the basis of a difference between first position information detected by a ranging sensor with respect to a target portion included in a body and second position information estimated by machine learning with respect to the target portion, the first position information or the second position information.

In this information processing apparatus, on the basis of a difference between first position information detected by a ranging sensor with respect to a target portion included in a body and second position information estimated by machine learning with respect to the target portion, the first position information or the second position information is selected. As a result, it is possible to recognize a target portion with high accuracy.

The selection unit may select the second position information where the difference between the first position information and the second position information is larger than a predetermined threshold value.

Each of the first position information and the second position information may be position information in a direction defined on the basis of a position of the ranging sensor.

Each of the first position information and the second position information may be position information in a measurement direction of the ranging sensor.

Each of the first position information and the second position information may be a coordinate value in a first coordinate axis constituting a three-dimensional coordinate system.

The information processing apparatus may further include an acquisition unit for acquiring specific information for specifying the target portion acquired from a detection result of a sensor. In this case, the selection unit may acquire, on the basis of the acquired specific information, at least one of the first position information and the second position information.

The specific information may be a coordinate value of the target portion in each of a second coordinate axis and a third coordinate axis different from the first coordinate axis, the second coordinate axis and the third coordinate axis constituting the three-dimensional coordinate system.

The information processing apparatus may further include an occlusion determination unit that determines, on the basis of the first position information and the second position information, presence/absence of occlusion with respect to the target portion.

The occlusion determination unit may determine, on the basis of the difference between the first position information and the second position information, the presence/absence of occlusion.

The occlusion determination unit may determine, where the difference between the first position information and the second position information is larger than a predetermined threshold value, that the occlusion has occurred.

The occlusion determination unit may determine, where the second position information is larger than the first position information with reference to a position of the ranging sensor, that the occlusion has occurred.

The information processing apparatus may further include a state determination unit that determines, on the basis of a determination result of the occlusion determination unit, state information relating to a state of the target portion.

The state information may include an operation of the target portion and a shape of the target portion.

The state determination unit may determine the state information where it is determined that the occlusion has occurred at a predetermined feature point relating to the target portion.

The information processing apparatus may further include a reliability determination unit that determines reliability of the first position information detected by the ranging sensor.

The reliability determination unit may determine, on the basis of the difference between the first position information and the second position information, the reliability of the first position information.

The selection unit may select the second position information where the reliability of the first position information is lower than a predetermined threshold value.

The target portion may include a hand.

An information processing method according to an embodiment of the present technology is an information processing method executed by a computer system, including: selecting, on the basis of a difference between first position information detected by a ranging sensor with respect to a target portion included in a body and second position information estimated by machine learning with respect to the target portion, the first position information or the second position information.

A program according to an embodiment of the present technology causes a computer system to execute the following step of:

selecting, on the basis of a difference between first position information detected by a ranging sensor with respect to a target portion included in a body and second position information estimated by machine learning with respect to the target portion, the first position information or the second position information.

BRIEF DESCRIPTION OF DRAWINGS

FIG. 1 is a schematic diagram for describing an outline of an information selection system.

FIG. 4 is a schematic diagram showing an example of a feature point in a target portion.

FIG. 5 is a table showing a specific example of selection of position information and determination of occlusion.

FIG. 7 is a table showing a specific example of determination of the state of the target portion and results.

FIG. 8 is a schematic diagram showing an example of the state of the target portion.

FIG. 9 is a schematic diagram showing an example of the state of the target portion.

MODE(S) FOR CARRYING OUT THE INVENTION

Figure 2:
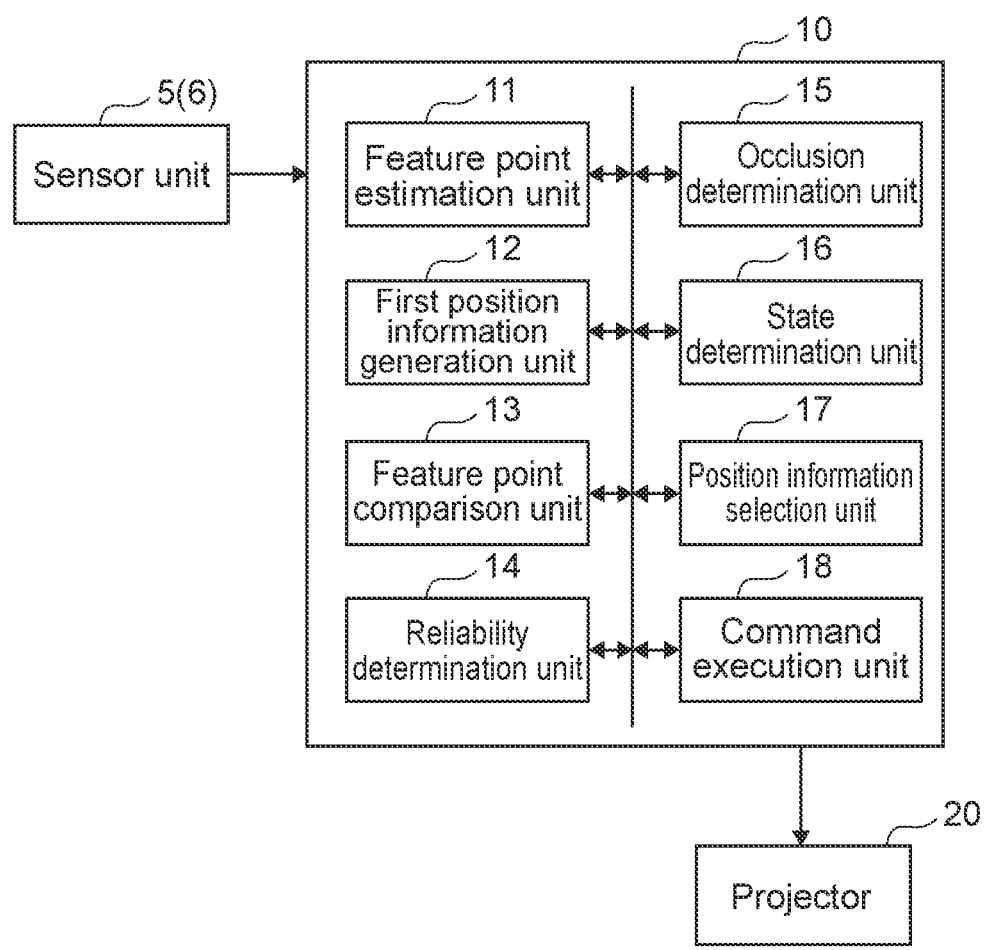
FIG. 2 is a block diagram showing a functional configuration example of the information selection system and an information processing apparatus.

Hereinafter, an embodiment according to the present technology will be described with reference to the drawings.

Object Recognition System

FIG. 1 is a schematic diagram for describing an outline of an object recognition system according to the present technology.

An object recognition system 100 according to the present technology is capable of selecting, on the basis of a difference between first position information 7 detected by a ranging sensor 6 with respect to a target portion 2 included in a body and second position information 8 estimated by machine learning with respect to the target portion 2, the first position information 7 or the second position information 8.

By using the object recognition system 100, it is possible to recognize the target portion 2 with high accuracy. For example, it is possible to execute determination of various operations using the target portion 2 with high accuracy on the basis of the recognition result by the object recognition system 100.

The target portion 2 is an arbitrary portion included in a body. In the example shown in FIG. 1, the arm or hand of a user 1 is set as the target portion 2. It goes without saying that the target portion 2 is not limited. For example, a portion such as the foot of the user 1 may be set as the target portion 2. Further, the entire body (the user 1 himself/herself) may be set as the target portion 2 or a plurality of portions such as both hands and both feet may be set as the target portion 2.

The position information includes various types of information indicating the position of the target portion 2.

As the position information, for example, a coordinate value (e.g., an XYZ coordinate value) defined by an absolute coordinates system (world coordinates system) may be used. Alternatively, a coordinate value (e.g., an xyz coordinate value or a uvd coordinate value) defined by a relative coordinate system with a predetermined point as a reference (an origin) may be used. In the case where the relative coordinate system is used, the origin used as a reference may be arbitrarily set.

As the position information of the target portion 2, position coordinates of each of one or more feature points included in the target portion 2 may be used. For example, in the case where the target portion 2 is a hand, the tip of a finger, a first joint, a second joint, a wrist, and the like can be set as feature points. It goes without saying that the present technology is not limited thereto.

The first position information is position information of the target portion 2 detected by the ranging sensor 6.

In this embodiment, as the first position information, position information in a predetermined one direction is calculated. The predetermined one direction is a direction defined on the basis of the position of the ranging sensor 6.

Typically, position information in the measurement direction of the ranging sensor 6 is used. That is, typically, the distance to the target portion 2 detected by the ranging sensor 6 is used as the first position information.

For example, the ranging sensor 6 is disposed such that the measurement direction of the ranging sensor 6 is parallel to the axial direction of the Z coordinate axis. Then, a Z coordinate value is calculated on the basis of the distance to the target portion 2 detected by the ranging sensor 6. This Z coordinate value is a value calculated in accordance with the position of the origin and a value corresponding to the distance to the target portion 2 detected by the ranging sensor 6. This Z coordinate value can be used as the first position information.

Assumption is made that the measurement direction of the ranging sensor 6 and the axial direction of the Z coordinate axis are not parallel to each other. Even in this case, by executing projective transformation or the like on the distance to the target portion 2 executed by the ranging sensor 6, it is possible to calculate the Z coordinate value and use it as the first position information.

As described above, the first position information includes position information in the direction defined on the basis of the position of the ranging sensor 6 (e.g., the measurement direction), a coordinate value, in the Z coordinate axis constituting a three-dimensional coordinate system, and the like. Note that the Z coordinate axis constituting a three-dimensional coordinate system corresponds to an embodiment of a first coordinate axis according to the present technology.

The second position information is position information of the target portion 2 estimated by machine learning.

The second position information is position information in the case where the first position information of the target portion 2 detected by the ranging sensor 6 is estimated by machine learning. Data (information) and the like to be input to machine learning are not limited, and arbitrary data (information) may be input. For example, the second position information may be estimated by machine learning with the distance to the target portion 2 detected by the ranging sensor 6 as an input.

For example, assumption is made that as the first position information, position information in the direction defined on the basis of the position of the ranging sensor 6 is detected. In this case, position information in the direction defined on the basis of the position of the ranging sensor 6, which is estimated by machine learning, is used as the second position information.

Assumption is made that as the first position information, position information in the measurement direction of the ranging sensor 6 is detected. In this case, position information in the measurement direction of the ranging sensor 6, which is estimated by machine learning, is used as the second position information.

Assumption is made that as the first position information, a coordinate value in the first coordinate axis (e.g., the Z coordinate axis) constituting the three-dimensional coordinate system is detected. In this case, a coordinate value in the first coordinate axis (e.g., the Z coordinate axis) constituting the three-dimensional coordinate system, which is estimated by machine learning, is used as the second position information.

The type of a machine learning algorithm for estimating the second position information is not limited.

For example, an arbitrary machine-learning algorithm using a DNN (Deep Neural Network) or the like may be used. For example, by using AI (artificial intelligence) or the like that performs deep learning, it is possible to improve estimation accuracy of the second position information.

For example, a learning unit and an identification unit are constructed for estimating the second position information. The learning unit performs machine learning on the basis of input information (learning data) and outputs the learning result. Further, the identification unit identifies (determines, predicts, etc.) the input information on the basis of the input information and the learning result.

For example, a neural network or deep learning is used as the learning method in the learning unit. The neural network is a model that imitates a brain neural circuit of a human and includes three types of layers, i.e., an input layer, an intermediate layer (hidden layer), and an output layer.

The deep learning is a model that uses a neural network having a multilayer structure, and is capable of repeating characteristic learning in each layer and learning complex patterns hidden in a large amount of data.

The deep learning is used to, for example, identify an object in an image and a word in voice. For example, a convolutional neural network (CNN) used for recognizing an image and a moving image is used.

Further, as a hardware structure for realizing such machine learning, a neurochip/neuromorphic chip incorporating the concept of a neural network can be used.

The problem setting in machine learning includes supervised learning, unsupervised learning, semi-supervised learning, reinforcement learning, inverse reinforcement learning, active learning, and transfer learning.

For example, in the supervised learning, a feature amount is learned on the basis of given labeled learning data (teaching data). As a result, it is possible to derive a label of unknown data.

Further, in the unsupervised learning, a large amount of unlabeled learning data is analyzed to extract a feature amount, and clustering is performed on the basis of the extracted feature amount. As a result, it is possible to analyze trends and predict the future on the basis of a huge amount of unknown data.

Further, the semi-supervised learning is a mixture of the supervised learning and the unsupervised learning, and is a method of giving a huge amount of training data by the unsupervised learning after learning a feature amount by the supervised learning and repeatedly performing learning while automatically calculating a feature amount.

Further, the reinforcement learning deals with the problem that an agent in an environment observes the current state and determines what action to take. The agent obtains a reward from the environment by selecting an action and learns how to obtain the most rewards through a series of actions. By learning the optimal solution in an environment as described above, it is possible to reproduce the judgment of a human and cause a computer to learn judgment exceeding that of the human.

It is also possible to generate virtual sensing data by machine learning. For example, it is possible to predict sensing data from other sensing data and use the predicted sensing data as input information, e.g., it is possible to generate position information from the input image information.

Further, it is possible to generate different sensing data from a plurality of pieces of sensing data. Further, it is also possible to predict necessary information and generate predetermined information from sensing data.

Further, an arbitrary learning algorithm or the like different from the machine learning described above may be used. For example, the second position information may be estimated by a rule base in which the average value of the second position information in the target portion 2 is registered in advance. By estimating the second position information in accordance with a predetermined learning algorithm, it is possible to improve estimation accuracy of the second position information. It goes without saying that the present technology is not limited to the case of using a learning algorithm.

Note that the application of a learning algorithm may be performed on arbitrary processing in the present disclosure.

As shown in FIG. 1, the object recognition system 100 includes a sensor unit 5, an information processing apparatus 10, and a projector 20.

The sensor unit 5, the information processing apparatus 10, and the projector 20 are wired or wirelessly connected to each other so as to be communicable. The connection form between the respective devices is not limited. For example, wireless LAN communication such as WiFi or short-range wireless communication such as Bluetooth (registered trademark) can be used.

The object recognition system 100 displays a display object 3 on a table 25. The display object 3 is displayed such that the user 1 can operate the display object 3. The method of displaying the display object 3 on a top surface 26 of the table 25 in this way is referred to also as a projection type. Further, the method of displaying the display object 3 on the top surface 26 of the table 25 is referred to also as a table top screen.

The display object 3 includes an object to be displayed on a projector, a display, or the like. For example, the display object 3 includes an image and a moving image to be projected on a screen, a table, or the like. It goes without saying that the present technology is not limited thereto, and a virtual image such as a hologram and a virtual object such as AR (Augmented Reality) are also included in the display object 3.

The user 1 can perform, by the target portion 2 or the like, various operations on the display object 3 displayed on the table 25 by the projector 20. Further, the user 1 can cause, by placing an object on the top surface 26 of the table 25 and causing the sensor unit 5 to recognize the object, the object recognition system 100 to execute various types of processing relating to the object.

The sensor unit 5 includes the ranging sensor 6 and an imaging device (reference symbols is omitted), and is capable of detecting various types of data relating to the target portion 2.

For example, it is possible to acquire a moving image including the target portion 2 by the imaging device such as a camera. The moving image includes a moving image and an image.

The ranging sensor 6 includes an arbitrary device capable of measuring the distance to an object to be measured. For example, as the ranging sensor 6, a ToF (Time of Flight) camera, passive stereo, active stereo, a stereo camera, a laser ranging sensor, LiDAR (Light Detection and Ranging, Laser Imaging Detection and Ranging), or the like is used.

In addition thereto, an arbitrary device may be used as the sensor unit 5. For example, a digital camera, a monocular camera, an infrared camera, a polarized camera, and another imaging device is used. Further, a sensor device such as a contact sensor, an ultrasonic sensor, a sonar, an illuminometer, and a biosensor may be used.

Further, the sensor unit 5 acquires information relating to the operation by the user 1 and information relating to the shape, pattern, and the like of an object placed on the table 25.

In the example shown in FIG. 1, the sensor unit 5 and the projector 20 are provided above the table 25 while being suspended from the ceiling. The method of irradiating the table 25 from above by the projector 20 to display information on the top surface 26 of the table 25 is referred to also as an upper projection type. As the sensor unit 5, a camera that images the table 25 with one lens may be used, a stereo camera capable of imaging the table 25 with two lenses to record information of the Z-axis direction may be used, or a microphone for collecting the voice uttered by the user 1 and the environmental sound may be used.

Further, in the case where a camera that images the table 25 with one lens is used as the sensor unit 5, the captured image may be analyzed to recognize the object placed on the table 25. Further, in the case where a stereo camera is used as the sensor unit 5, the target portion 2 placed on the table 25 can be recognized on the basis of the height acquired by the stereo camera.

Further, in the case where a microphone is used as the sensor unit 5, a microphone array for collecting sounds in a specific direction may be used as the microphone. In the case where a microphone array is used as the sensor unit 5, the sound collection direction may be adjusted to an arbitrary direction.

Figure 11:
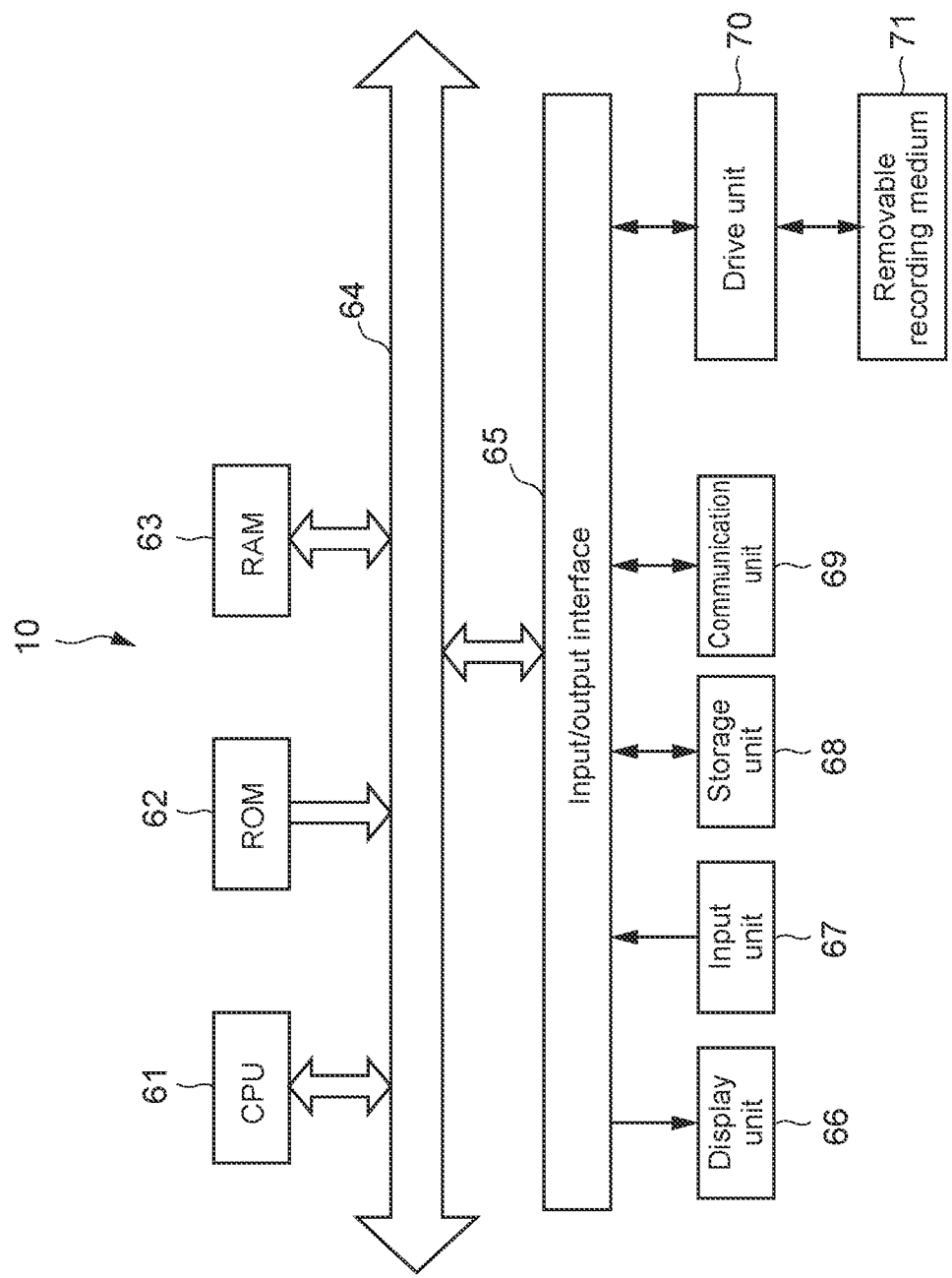
FIG. 11 is a block diagram showing a hardware configuration example of the information processing apparatus.

The information processing apparatus 10 includes hardware necessary for configuring a computer, such as a processor such as a CPU, a GPU, and a DSP, a memory such as a ROM and a RAM, and a storage device such as an HDD (see FIG. 11). For example, the CPU loads the program according to the present technology stored in the ROM or the like in advance in the RAM and executes the program, thereby executing an information processing method according to the present technology.

For example, the information processing apparatus 10 can be realized by an arbitrary computer such as a PC (Personal Computer). It goes without saying that hardware such as FPGA and ASIC may be used.

In this embodiment, when the CPU executes a predetermined program, a position information selection unit 17 as a functional block is configured. It goes without saying that dedicated hardware such as an IC (integrated circuit) may be used in order to realize a functional block.

The program is installed in the information processing apparatus 10 via, for example, various recording media. Alternatively, the program may be installed via the Internet or the like.

The type and the like of the recording medium on which a program is recorded is not limited, and an arbitrary computer-readable recording medium may be used. For example, an arbitrary non-transient computer-readable storage medium may be used.

The information processing apparatus 10 acquires the first position information 7 and the second position information 8 of the target portion 2. Note that in the present disclosure, acquisition of information includes receiving information transmitted from the outside and generating information by the information processing apparatus 10 itself.

The information processing apparatus 10 illustrated in FIG. 1 selects, on the basis of the difference between the acquired first position information 7 of the target portion 2 and the acquired second position information 8 of the target portion 2, the first position information 7 or the second position information 8.

FIG. 2 is a block diagram showing a functional configuration example of the object recognition system 100 and the information processing apparatus 10.

The information processing apparatus 10 includes a feature point estimation unit 11, a first position information generation unit 12, a feature point comparison unit 13, a reliability determination unit 14, an occlusion determination unit 15, a state determination unit 16, the position information selection unit 17, and a command execution unit 18.

The feature point estimation unit 11 estimates a feature point of the target portion 2. In this embodiment, a feature point in the target portion 2 acquired by a detection result of the sensor unit 5 is estimated. Further, the feature point estimation unit 11 is capable of estimating second position information of a feature point in the target portion 2 by machine learning. That is, it can be also said that second position information of a feature point in the target portion 2 is generated.

The estimation of a feature point includes acquiring various types of information of a feature point. For example, coordinates indicating the position of a feature point, a position relationship between feature points, or the like may be estimated.

Note that an arbitrary technology (algorithm and the like) for estimating a feature point may be adopted. Further, a second position information generation unit that generates second position information by machine learning for the feature point estimated by the feature point estimation unit 11 may be configured.

The first position information generation unit 12 generates first position information for the target portion 2. In this embodiment, the first position information generation unit 12 acquires a detection result of the ranging sensor 6 and generates first position information on the basis of the detection result. For example, the Z coordinate of the feature point is detected on the basis of XY coordinates of the feature point estimated by the feature point estimation unit 11.

That is, the first position information generation unit 12 acquires, as specific information, the X coordinate and Y coordinate of a feature point. The specific information is information for specifying the target portion 2 acquired by a detection result of the sensor unit 5. For example, specific information is a coordinate value in each of a second coordinate axis and a third coordinate axis different from a first coordinate axis, the second coordinate axis and the third coordinate axis constituting a three-dimensional coordinate system.

Note that in this embodiment, coordinates in the X-axis direction and the Y-axis direction correspond to a coordinate value in each of the second coordinate axis and the third coordinate axis.

The feature point comparison unit 13 compares the first position information and the second position information in the feature point with each other. In this embodiment, the Z coordinate detected by the ranging sensor 6 and the Z coordinate estimated by machine learning, in the feature point estimated by the feature point estimation unit 11, are compared with each other as a difference.

The reliability determination unit 14 determines the reliability of position information. In this embodiment, the reliability of the first position information detected by the ranging sensor 6 is determined. For example, the reliability of the first position information is determined on the basis of an RGB image, an IR (Infra-Red) image, or the like acquired by the ranging sensor 6. The specific method of determining the reliability will be described with reference to FIG. 10.

Examples of the cause of the decrease in the reliability of the first position information include a case where TOF is used as the ranging sensor 6 in the outdoors where sunlight is strong.

Other examples include a case where passive stereo was used as the ranging sensor 6 with no pattern such as a background of the same color or a similar pattern in which the same objects are arranged.

The other examples include a case where active stereo was used as the ranging sensor 6 with an invisible pattern such as a black object, shadow, and blown out highlights due to illumination or a similar pattern in which the same objects are arranged.

The reliability of the first position information determined by the reliability determination unit 14 is output to the position information selection unit 17.

The occlusion determination unit 15 determines, on the basis of the first position information and the second position information, the presence/absence of occlusion with respect to the target portion 2. In this embodiment, the presence/absence of occlusion of the respective feature points in the target portion 2 is determined on the basis of the difference of the Z coordinates of the respective feature points compared by the feature point comparison unit 13. For example, in the case where a hand is set as the target portion 2, the presence/absence of occlusion of the tip of a finger that is a feature point is determined.

The occlusion is a state in which an object in front hides (makes invisible) an object behind. Examples thereof include a case where the tip of a finger cannot be seen from the back of a hand when the hand is closed. Such a case where an object cannot be seen (cannot be detected by a sensor) when the object is seen (detected by a sensor) from a predetermined point is included in the occlusion.

It goes without saying that other states may be determined as occlusion. For example, an object housed inside a casing having a high light-shielding property may be determined as occlusion. That is, a case where the reliability of a detection result of a sensor is low may be determined as occlusion.

Note that in the following description, occlusion or occurrence of occlusion will be described as "hidden". Further, a case where it is not occlusion will be described as "not hidden" in some cases.

The state determination unit 16 determines state information relating to the state of the target portion 2. In this embodiment, state information of the target portion 2 is determined on the basis of a determination result of the occlusion determination unit 15. A specific example will be described with reference to FIG. 7.

The state information includes an operation of the target portion 2 and the shape of the target portion 2. For example, in the case where a predetermined feature point in the target portion 2 is determined to be occlusion, the hand that is the target portion 2 is determined to be rock (state of a hand closed).

The operation of the target portion 2 includes various operations such as movement in the horizontal or vertical direction, vibration, and rotation. In addition thereto, various operations such as a hand signal used in sports or the like may be included.

The shape of the target portion 2 includes, for example, scissors (the state in which only the index finger and the middle finger are extended) and paper (the state of a hand opened) in the case where the target portion 2 is the hand. In addition thereto, various shapes may be included in accordance with the target portion 2.

The position information selection unit 17 selects the first position information or the second position information. In this embodiment, the first position information or the second position information is selected on the basis of the difference between the first position information and the second position information compared by the feature point comparison unit 13.

Further, in this embodiment, the first position information or the second position information is selected on the basis of the reliability of the first position information determined by the reliability determination unit 14.

A specific method of selecting the first position information and the second position information will be described with reference to FIG. 5.

The command execution unit 18 executes a command corresponding to the action performed by the user 1. For example, in the case where the user 1 has moved his/her finger while touching the display object 3 displayed on the top surface 26 of the table 25, the display object 3 is caused to move so as to follow the movement of the finger. Note that the type of the command to be executed may be appropriately changed in accordance with the application to be executed.

The projector 20 is capable of outputting various display objects 3. In this embodiment, the projector 20 outputs the display object 3 on the top surface 26 of the table 25 on the basis of the command to be executed by the command execution unit 18. Note that the area in which the display object 3 is output by the projector 20 is not limited to the top surface 26 of the table 25. For example, the area in which the display object 3 is output by the projector 20 may be a floor surface, a wall surface, or an object. Further, the projector 20 may include a speaker, a lighting device, and the like.

Note that in this embodiment, the position information selection unit 17 corresponds to a selection unit that selects, on the basis of a difference between first position information detected by the ranging sensor 6 with respect to a target portion included in a body and second position information estimated by machine learning with respect to the target portion, the first position information or the second position information.

Further, in this embodiment, the feature point estimation unit 11 corresponds to an acquisition unit for acquiring specific information for specifying the target portion acquired from a detection result of a sensor.

Further, in this embodiment, the reliability determination unit 14 corresponds to a reliability determination unit that determines reliability of the first position information detected by the ranging sensor 6.

Further, in this embodiment, the occlusion determination unit 15 corresponds to an occlusion determination unit that determines, on the basis of the first position information and the second position information, presence/absence of occlusion with respect to the target portion.

Further, in this embodiment, the state determination unit 16 corresponds to a state determination unit that determines, on the basis of a determination result of the occlusion determination unit, state information relating to a state of the target portion.

Figure 3:
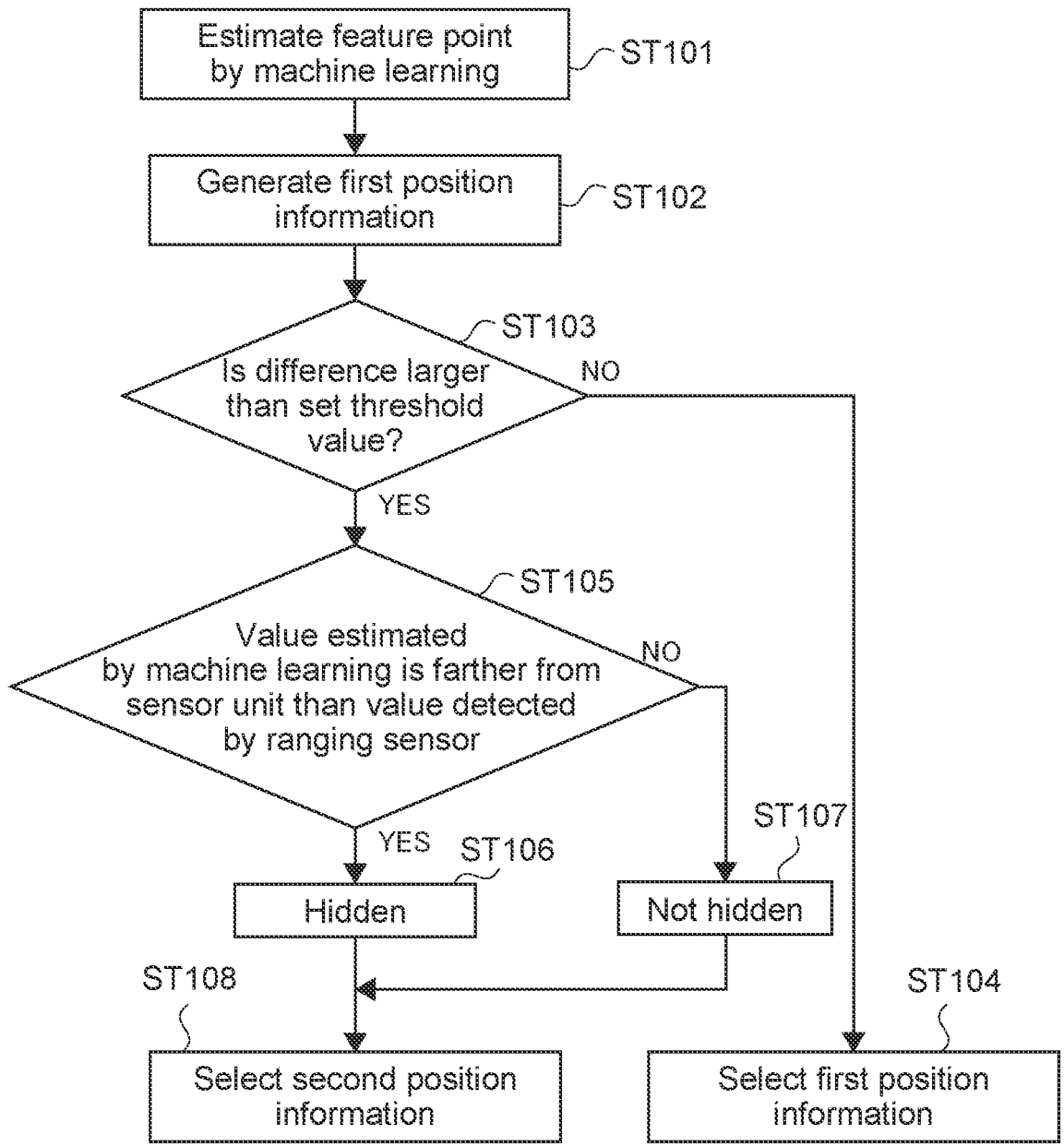
FIG. 3 is a flowchart showing an example of a method of selecting position information.

FIG. 3 is a flowchart showing an example of a method of selecting position information. FIG. 4 is a schematic diagram showing an example of a feature point in the target portion 2. In FIG. 4, a hand 30 is set as the target portion 2.

The feature point estimation unit 11 estimates, on the basis of a detection result acquired from the sensor unit 5, a feature point by machine learning (Step 101). Further, second position information in the estimated feature point is generated.

Part A of FIG. 4 is a schematic diagram showing the target portion 2 as viewed from the Z-axis direction.

As shown in Part A of FIG. 4, the feature point estimation unit 11 estimates a feature point for the hand 30. In Part A of FIG. 4, feature points are illustrated on the wrist, fingertip, first joint, second joint, base of the finger, wrist, and the like of the hand 30.

For example, in Part A of FIG. 4, when viewed from the Z direction, the first joint of the thumb, a tip 31 of the thumb, the first joint of the middle finger, a tip 32 of the middle finger, the first joint of the ring finger, the second joint of the ring finger, a tip of the ring finger, the first joint of the little finger, the second joint of the little finger, and a tip 34 of the little finger are hidden and are therefore illustrated by white circles.

Further, when viewed from the Z direction, feature points of the wrist, the base of the finger, the first joint of the index finger, the second joint of the index finger, and a tip 35 of the index finger are not hidden and are therefore illustrated by black circles.

Note that the term "hidden" in FIG. 4 includes being determined that occlusion has occurred in the feature point by the occlusion determination unit 15 when viewed from the Z direction.

The first position information generation unit 12 generates first position information in each of the estimated feature points (Step 102). In this embodiment, first position information and second position information in the feature point illustrated by a black circle in Part A of FIG. 4 are generated. Further, first position information and second position information in the feature point illustrated by a white circle are generated.

The feature point comparison unit 13 compares the first position information and the second position information in the feature point with each other (Step 103). In this embodiment, the Z coordinate of the feature point detected by the ranging sensor 6 and the Z coordinate of the feature point estimated by machine learning are compared with each other. Further, in this embodiment, the sensor unit 5 is set as the origin. That is, the Z coordinate is a distance between the sensor unit 5 and the feature point.

Part B of FIG. 4 is a schematic diagram showing the target portion 2 as viewed from the X-axis direction. Note that in Part B of FIG. 4, some of the feature points illustrated in Part A of FIG. 4 are omitted for the sake of description.

As shown in Part B of FIG. 4, a Z coordinate 36 of the feature point 35 of the tip of the index finger, which is detected by the ranging sensor 6, and the Z coordinate estimated by machine learning are compared with each other. Further, a Z coordinate 37 of the feature point 32 of the tip of the middle finger, which is detected by the ranging sensor 6, and the Z coordinate estimated by machine learning are compared with each other.

For example, in the case where a difference a between the Z coordinate of the feature point 35 of the tip of the index finger and the Z coordinate 36 of the feature point 35 detected by the ranging sensor 6 is smaller than a set threshold value (NO in Step 103), the position information selection unit 17 selects the first position information (the Z coordinate 36 of the feature point 35) (Step 104).

Further, for example, in the case where a difference b between the Z coordinate of the feature point 32 of the tip of the middle finger and the Z coordinate 37 of the feature point 32 detected by the ranging sensor 6 is larger than a set threshold value (YES in Step 103), the feature point comparison unit 13 determines whether or not the value estimated by machine learning (the Z coordinate of the feature point 32) is farther from the sensor unit 5 than the value detected by the ranging sensor 6 (the Z coordinate 37 of the feature point 32) (Step 105).

In the case where the value of the feature point 32 estimated by machine learning is farther from the sensor unit 5 (the ranging sensor 6) than the value of the feature point 32 detected by the ranging sensor 6 (YES in Step 105), the occlusion determination unit 15 determines that the feature point 32 is hidden (Step 106). Further, the position information selection unit 17 selects the second position information of the feature point 32 (Step 108).

Further, in the case where the value of the feature point estimated by machine learning is not farther from the sensor unit 5 than the value detected by the ranging sensor 6 (NO in Step 105), the occlusion determination unit 15 determines that the feature point is not hidden (Step 107).

Further, the position information selection unit 17 selects the second position information of the feature point (Step 108). Note that the Step of selecting position information is not limited. For example, in the case where the occlusion determination unit 15 has determined that the feature point is not hidden in Step 107, the first position information may be selected in Step 104.

FIG. 5 is a table showing a specific example of selection of position information and determination of occlusion. In FIG. 5, a specific determination example of Steps 103 and 105 is illustrated.

Here, the set threshold value is referred to as t. Further, the value of the Z coordinate of the feature point detected by the ranging sensor 6 is referred to as the value of a ranging sensor. Further, the value of the Z coordinate of the feature point estimated by machine learning is referred to as the machine learning estimation value. Note that the threshold value may be arbitrarily set. For example, the threshold value may be set considering the size of the hand of a child.

In the case where the absolute value of the difference between the machine learning estimation value in the feature point and the value of a ranging sensor is the threshold value t or less, the position information selection unit 17 selects the first position information. Further, the occlusion determination unit 15 determines that the feature point is not hidden.

In the case where the absolute value of the difference between the machine learning estimation value in the feature point and the value of a ranging sensor is larger than the threshold value t, the position information selection unit 17 selects the second position information. Further, the occlusion determination unit 15 determines that the feature point is hidden.

In the case where the machine learning estimation value in the feature point is larger than the value of a ranging sensor and the absolute value of the difference between the machine learning estimation value and the value of a ranging sensor is larger than the threshold value t, the position information selection unit 17 selects the second position information. Further, the occlusion determination unit 15 determines that the feature point is hidden.

In the case where the machine learning estimation value in the feature point is smaller than the value of a ranging sensor and the absolute value of the difference between the machine learning estimation value and the value of a ranging sensor is larger than the threshold value t, the position information selection unit 17 selects the second position information. Further, the occlusion determination unit 15 determines that the feature point is not hidden.

Note that the criteria for determining occlusion of a feature point are not limited. For example, occlusion of a feature point may be determined by image recognition, machine learning, or the like. Further, the term "larger than" may include "or more". Further, the term "smaller than" may include "or less" and "less than". Further, the criteria for determining occlusion may be an arbitrary combination of "larger than", "smaller than", "or more", "or less", and "less than".

Note that the threshold value used for selecting position information and the threshold value used as the criteria for determining occlusion of a feature point may be different from each other.

Figure 6:
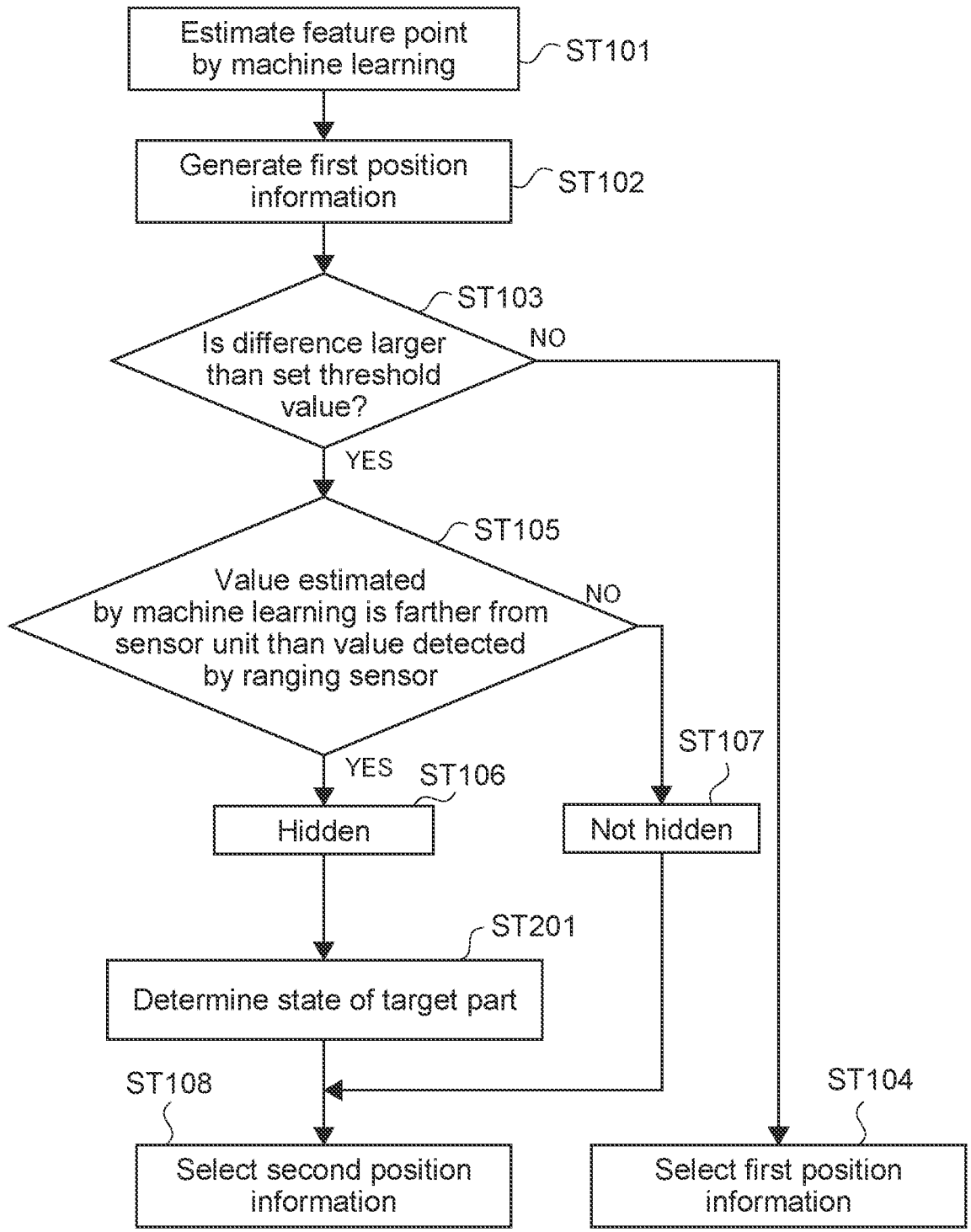
FIG. 6 is a flowchart for determining the state of the target portion.

FIG. 6 is a flowchart for determining the state of the target portion 2. In FIG. 6, description of Steps 101 to 108 of the flowchart shown in FIG. 3 is omitted.

In the case where the occlusion determination unit 15 has determined that a feature point is hidden (Step 106), the state determination unit 16 determines state information of the target portion 2 (Step 201). In this embodiment, state information of the hand that is the target portion 2 is determined.

FIG. 7 is a table showing a specific example of determination of the state of the target portion 2 and results. FIG. 8 is a schematic diagram showing an example of the state of the target portion 2. FIG. 9 is a schematic diagram showing an example of the state of the target portion 2.

As shown in Part A of FIG. 8, the feature point estimation unit 11 estimates a feature point in a thumb 41 and an index finger 42 of a hand 40. In the left figure of Part A of FIG. 8, the thumb 41 and the index finger 42 are separated from each other. Here, assumption is made that the hand is rotated and the hand viewed from the sensor unit 5 is as shown in the right figure of Part A of FIG. 8. That is, the thumb 41 and the index finger 42 are hidden from the sensor unit 5. In this case, the state determination unit 16 determines that the hand is in a shape specified in advance. Alternatively, it is determined that the hand 40 keeps (maintains) the shape (past state) shown in the left figure of Part A of FIG. 8.

For example, in the right figure of Part B of FIG. 8, a thumb 46 and an index finger 47 of a hand 45 are in contact with each other. Here, assumption is made that the hand is rotated similarly to Part A of FIG. 8 and the thumb 46 and the index finger 47 are hidden from the sensor unit 5. The state determination unit 16 determines that the hand 45 is in a state in which the thumb 46 and the index finger 47 are in contact with each other. That is, it is determined that the hand 45 keeps the shape shown in the left view of Part B of FIG. 8.

In addition thereto, in the case where a predetermined feature point is hidden, the shape of the hand may be determined as a shape specified in advance. As a result, it is possible to suppress an erroneous operation due to the use of a hidden feature point with low reliability.

Further, in this embodiment, the state of the hand is determined in accordance with the number of hidden feature points or the place of the target portion 2 corresponding to the feature point. For example, in the case where the feature points of a joint and the center of the hand are hidden, the state determination unit 16 determines that the hand is holding an object. Further, for example, one or more of predetermined feature points are hidden, the state determination unit 16 determines that the hand is holding an object.

Part A of FIG. 9 is a schematic diagram showing the state in which a hand 50 is holding an object 51.

As shown in Part A of FIG. 9, unhidden feature points 52 in the tip of the thumb, the joint of the thumb, the tip of the index finger, the tip of the middle finger, the tip of the ring finger, and the tip of the little finger, and hidden feature points 53 in the joint of the index finger, the joint of the middle finger, the joint of the ring finger, the joint of the little finger, and the center of the hand are illustrated.

For example, in the case where the object 51 is recognized as an object by a detection result of the sensor unit 5 and feature points of the joint and the center of the hand are hidden, the state determination unit 16 determines that the hand 50 is holding the object 51.

Further, for example, in the case where the object 51 is recognized as an object by a detection result of the sensor unit 5 and a predetermined feature point is hidden, the state determination unit 16 determines that the hand 50 is holding the object 51.

Note that the method of recognizing the object 51 is not limited. For example, the object 51 may be recognized as an object by machine learning or the like.

Part B of FIG. 9 is a schematic diagram showing the state of a hand 55 in a predetermined shape. Note that in Part B of FIG. 9, feature points of the first joint of the thumb, the first joint of the middle finger, and the like are omitted.

As shown in Part B of FIG. 9, the shape of the hand 55 is in the state in which the index finger is extended and the other fingers are closed. Note that this shape of the hand 55 is referred to as the pointing shape.

In Part B of FIG. 9, the occlusion determination unit 15 determines that feature points of a tip of the thumb, a tip 57 of the middle finger, a tip 58 of the ring finger, and a tip 59 of the little finger are hidden. The state determination unit 16 determines that there is a hidden feature point. In this case, the state determination unit 16 outputs a determination result to the command execution unit 18. The command execution unit 18 performs control such that various inputs of the finger corresponding to the hidden feature point are not performed. That is, in the case where the shape of the hand 55 is the pointing shape, only an input of the protruding index finger is accepted.

For example, the command execution unit 18 is capable of preventing an input such as a touch operation of the display object 3 by the tip 56 of the thumb, the tip 57 of the middle finger, the tip 58 of the ring finger, and the tip 59 of the little finger from being accepted. As a result, it is possible to suppress an erroneous operation of the target portion 2 corresponding to the hidden feature point.

Further, since the feature point of the specified finger is hidden, the shape corresponding to the hidden finger is determined by the state determination unit 16. For example, in the case where it is determined that the feature points of the tips of the fingers other than the tip of the index finger and the tip of the middle finger are hidden, the hand is determined as a peace sign (only the index finger and the middle finger are extended). As a result, it is possible to suppress erroneous touching of the hidden feature point with low reliability. Further, it is possible to easily determine the shape of the target portion 2.

As described above, in the information processing apparatus 10 according to this embodiment, on the basis of the difference between the first position information 7 detected by the sensor unit 5 with respect to the target portion 2 included in a body and the second position information 8 estimated by machine learning with respect to the target portion 2, the first position information 7 or the second position information 8 is selected. As a result, it is possible to recognize a target portion with high accuracy.

In the detection of a feature point in a three-dimensional coordinate system by machine learning, distance information acquired from a ranging sensor is more accurate than the Z value obtained by machine learning in some cases. In the case of machine learning, it is possible to estimate the feature point of the hidden place. However, since an expected value for learning data is obtained, the result of machine learning is not accurate in some cases when the amount of learning data is small or the distribution is biased.

Meanwhile, the distance information acquired from a ranging sensor can be accurately obtained in the case of a visible surface. However, the feature point of the hidden place cannot be measured. Further, there is a possibility that distance information cannot be accurately acquired due to the effects of sunlight and featureless patterns.

In this regard, in the present technology, on the basis of a difference between first position information detected by a ranging sensor and second position information estimated by machine learning with respect to the target portion, the first position information or the second position information is selected. As a result, it is possible to recognize a target portion with high accuracy. Further, robust recognition for occlusion or the like is possible even in the detection of the same viewpoint by one sensor unit.

OTHER EMBODIMENTS

The present technology is not limited the embodiment described above, and various other embodiments can be realized.

In the embodiment described above, the occlusion determination unit 15 has determined the presence/absence of occlusion of a feature point. The present technology is not limited thereto, and an arbitrary method may be adopted for determining occlusion of a feature point. For example, the presence/absence of occlusion of a feature point may be determined from the shape of the hand by a rule base registered in advance. Further, the presence/absence of occlusion of a feature point may be determined using machine learning.

Further, in the embodiment described above, the occlusion determination unit 15 has determined the presence/absence of occlusion of a feature point and then the position information selection unit 17 has selected the second position information. The present technology is not limited thereto, and the presence/absence of occlusion of a feature point does not necessarily need to be determined.

Figure 10:
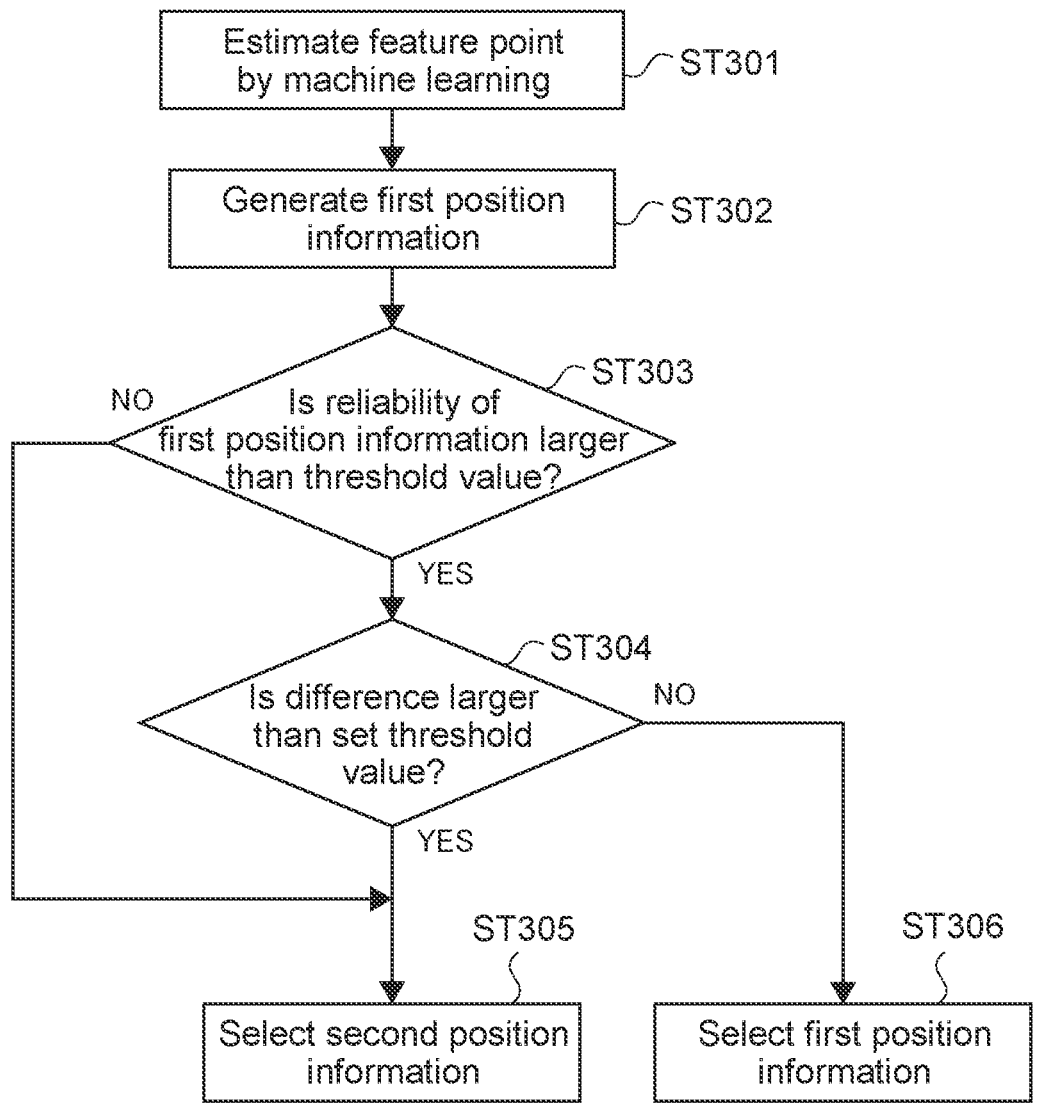
FIG. 10 is a flowchart showing another example the method of selecting position information.

FIG. 10 is flowchart showing another example of the method of selecting position information.

The feature point estimation unit 11 estimates, on the basis of a detection result acquired from the sensor unit 5, a feature point by machine learning (Step 301). Further, second position information in the estimated feature point is generated.

The first position information generation unit 12 generates first position information in each of the estimated feature points (Step 302).

The reliability determination unit 14 determines whether or not the reliability of the first position information is larger than a predetermined threshold value (Step 303).

Assumption is made that TOF is used as the ranging sensor 6 when the first position information of the target portion 2 is detected. In this case, the reliability determination unit 14 determines the reliability of the first position information on the basis the value of an illuminometer. For example, in the case where the value of an illuminometer is high, the reliability of the first position information is determined to be low.

Assumption is made that passive stereo is used as the ranging sensor 6 when the first position information of the target portion 2 is detected. In this case, the reliability determination unit 14 determines the reliability of the first position information on the basis of the luminance histogram for each area set in advance. Alternatively, the reliability determination unit 14 determines the reliability of the first position information on the basis of pattern matching performed on the pattern of a predetermined area. For example, in the case where it has been determined by pattern matching that there is an object similar to the target portion 2, the reliability of the first position information is determined to be high.

Assumption is made that active stereo is used as the ranging sensor 6 when the first position information of the target portion 2 is detected. In this case, the reliability determination unit 14 determines the reliability of the first position information on the basis of the luminance histogram for each area set in advance. Alternatively, the reliability determination unit 14 determines the reliability of the first position information on the basis of pattern matching performed on the pattern of a predetermined area. For example, in the case where it has been determined by pattern matching that there is an object similar to the target portion 2, the reliability of the first position information is determined to be high.

Note that the method of determining the reliability of the first position information is not limited. For example, the reliability may be determined on the basis of the light and shade and the luminance value of color.

In the case where the reliability of the first position information is smaller than a predetermined threshold value (NO in Step 303), the position information selection unit 17 selects the second position information of a feature point (Step 305).

In the case where the reliability of the first position information is larger than the predetermined threshold value (Yes in Step 303), the feature point comparison unit 13 compares the first position information and the second position information in the feature point with each other (Step 304).

In the case where the difference between the first position information and the second position information in the feature point is larger than a set threshold value (YES in Step 304), the position information selection unit 17 selects the second position information of the feature point (Step 305).

In the case where the difference between the first position information and the second position information in the feature point is smaller than the set threshold value (NO in Step 304), the position information selection unit 17 selects the second position information of the feature point (Step 306).

Note that the threshold value may be arbitrarily set. For example, the threshold value may be set on the basis of the performance of the sensor unit 5 or the surrounding environment. Further, the threshold value does not necessarily need to be set. For example, in the case where the cause of the decrease in the reliability described above has been detected, the processing of NO in Step 303 may be executed. It goes without saying that in the case where the cause of the decrease in the reliability is not detected, the processing of YES in Step 303 may be executed.

In the embodiment described above, the sensor unit 5 (the ranging sensor 6) has been disposed on the Z-axis direction with respect to the target portion 2. The present technology is not limited thereto, and the sensor unit 5 may be arbitrarily disposed. In this case, for example, projective transformation of the second position information in the feature point of the target portion 2 into a coordinate value corresponding to the measurement direction of the sensor unit 5 may be executed. Further, in the case where the coordinate system differs, e.g., the sensor unit 5 and the table 25 do not face each other, a rotation matrix, a translation vector, or the like may be used for calculation. For example, calculation may be performed in order to match the normal vector perpendicular to the top surface 26 of the table 25 and the vector in the measurement direction of the sensor unit 5 with each other. It goes without saying that in addition to this, a rotation vector, a translation matrix, a quaternion, an EULER angle, or the like may be used for calculation.

In the embodiment described above, the shape of the target portion 2 has been determined by the presence/absence of occlusion of a feature point. The present technology is not limited thereto, and the shape of the target portion 2 may be determined by an arbitrary method. For example, in the case where the target portion 2 is the hand, the shape may be recognized by using a rule base registered in advance on the basis of the number of tips, the tips from the texture of the hand being the fingertips. Further, skeleton estimation may be executed. The skeleton estimation is also called bone estimation or skeleton estimation and can be executed using a well-known technology.

In the embodiment described above, the reliability of the first position information has been determined. The present technology is not limited thereto, and, the reliability of the second position information may be determined. For example, in the case where the amount of learning data of machine learning is small, the reliability of the second position information may be determined to be low. Further, for example, in the case where the distribution of values estimated by machine learning is biased with respect to actual values, the reliability of the second position information may be determined to be low.

In the embodiment described above, on the basis of the XY coordinates of the feature point, the coordinate value of the Z coordinate detected by the ranging sensor 6 and the coordinate value of the Z coordinate estimated by machine learning have been compared with each other. The present technology is not limited thereto, and, the coordinate value of the Z coordinate detected by the ranging sensor 6 within a predetermined range with respect to the feature point estimated by machine learning and the coordinate value of the Z coordinate estimated by machine learning may be compared with each other.

In the embodiment described above, the display object 3 is displayed by the projector 20. The present technology is not limited thereto, and the device that displays the display object 3 may be a touch panel type display, an LCD (Liquid Crystal Display), an organic EL (Electro-Luminescence) display, or the like.

In the embodiment described above, a form of an upper projection type has been used for the object recognition system 100. The present technology is not limited thereto, and the projector 20 may irradiate a display object from below the table 25, thereby displaying the display object 3 on the top surface 26 of the table 25. In this case, the top surface 26 of the table 25 may be formed of a translucent material such as a glass plate and a plastic plate. Such a method in which the projector 20 irradiates a display object from below the table 25, thereby displaying the display object 3 on the top surface 26 of the table 25, is referred to also as a rear-projection type.

FIG. 11 is a block diagram showing a hardware configuration example of the information processing apparatus 10.

The information processing apparatus 10 includes a CPU 61, a ROM (Read Only Memory) 62, a RAM 63, an input/output interface 65, and a bus 64 connecting them to each other. A display unit 66, an input unit 67, a storage unit 68, a communication unit 69, a drive unit 70, and the like are connected to the input/output interface 65.

The display unit 66 is, for example, a display device using liquid crystal, EL, or the like. The input unit 67 is, for example, a keyboard, a pointing device, a touch panel, or another operating device. In the case where the input unit 67 includes a touch panel, the touch panel can be integrated with the display unit 66.

The storage unit 68 is a non-volatile storage device, and is, for example, an HDD, a flash memory, or another solid-state memory. The drive unit 70 is, for example, a device capable of driving a removable recoding medium 71 such as an optical recording medium and a magnetic recording tape.

The communication unit 69 is a modem, router, or another communication device for communicating with another device, which can be connected to a LAN, WAN, or the like. The communication unit 69 may be one that performs communication wired or wirelessly. The communication unit 69 is often used separately from the information processing apparatus 10.

In this embodiment, the communication unit 69 makes it possible to communicate with another device via a network.

The information processing by the information processing apparatus 10 having the hardware configuration described above is realized by the cooperation of software stored in the storage unit 68, the ROM 62, or the like and hardware resources of the information processing apparatus 10. Specifically, the information processing method according to the present technology is realized by loading the program configuring software stored in the ROM 62 or the like into the RAM 63 and executing the program.

The program is installed in the information processing apparatus 10 via, for example, the recording medium 61. Alternatively, the program may be installed in the information processing apparatus 10 via a global network or the like. In addition, an arbitrary computer-readable non-transient storage medium may be used.

The information processing apparatus, the information processing method, and the program according to the present technology may be executed and the information processing apparatus according to the present technology may be constructed by causing the computer installed in the communication terminal and another computer communicable via a network or the like to work together.

That is, the information processing apparatus, the information processing method, and the program according to the present technology can be executed not only in a computer system configured by a single computer but also in a computer system in which a plurality of computers operates in conjunction with each other. Note that in the present disclosure, the system means a set of a plurality of components (devices, modules (parts), etc.), and all the components do not necessarily need to be in the same casing. Therefore, a plurality of devices that is housed in separate casings and connected to each other via a network, and one device in which a plurality of modules is housed in one casing are both systems.

The execution of the information processing apparatus, the information processing method, and the program according to the present technology by a computer system includes, for example, both the case where generation of position information, comparison of feature points, selection of position information, and the like are executed by a single computer and the case where each type of processing is executed by different computers. Further, execution of each type of processing by a predetermined computer includes causing another computer to execute part or all of the processing and acquiring the result thereof.

That is, the information processing apparatus, the information processing method, and the program according to the present technology are applicable also to a configuration of cloud computing in which a plurality of apparatuses shares and collaboratively processes a single function via a network.

Each configuration of the reliability determination unit, the occlusion determination unit, the state determination unit, the position information selection unit, and the like, control flow of a communications system, and the like described with reference to the drawings are merely an embodiment, and can be arbitrarily modified without departing from the essence of the present technology. In other words, for example, other arbitrary configurations or algorithms for implementing the present technology may be adopted.

Note that the effects described in the present disclosure are merely illustrative and not restrictive, and other effects may be obtained. The description of the plurality of effects described above does not necessarily mean that these effects are exhibited simultaneously. It means that at least one of the effects described above can be achieved in accordance with the condition or the like, and it goes without saying that there is a possibility that an effect that is not described in the present disclosure is exhibited.

Of the characteristic portions of each embodiment described above, at least two characteristic portions can be combined with each other. That is, the various characteristic portions described in the respective embodiments may be arbitrarily combined with each other without distinguishing from each other in the respective embodiments.

In the present disclosure, concepts that define the shape, size, positional relationship, state, and the like such as "central", "middle", "uniform", "equal", "the same", "perpendicular", "parallel", "symmetrical", "extend", "axial direction", "columnar shape", "cylindrical shape", "ring shape", and "circular shape", are concepts including "substantially central", "substantially middle", "substantially uniform", "substantially equal", "substantially the same", "substantially perpendicular", "substantially parallel", "substantially symmetrical", "substantially extend", "substantially axial direction", "substantially columnar shape", "substantially cylindrical shape", "substantially ring shape", and "substantially circular shape".

For example, the states within a predetermined range (e.g., ±10%) based on "completely central", "completely middle", "completely uniform", "completely equal", "completely the same", "completely perpendicular", "completely parallel", "completely symmetrical", "completely extend", "completely axial direction", "completely columnar shape", "completely cylindrical shape", "completely ring shape", and "completely circular shape" are also included.

It should be noted that the present technology may also take the following configurations.

(1) An information processing apparatus, including:
a selection unit that selects, on a basis of a difference between first position information detected by a ranging sensor with respect to a target portion included in a body and second position information estimated by machine learning with respect to the target portion, the first position information or the second position information.

(2) The information processing apparatus according to (1), in which
the selection unit selects the second position information where the difference between the first position information and the second position information is larger than a predetermined threshold value.

(3) The information processing apparatus according to (1) or (2), in which
each of the first position information and the second position information is position information in a direction defined on a basis of a position of the ranging sensor.

(4) The information processing apparatus according to any one of (1) to (3), in which
each of the first position information and the second position information is position information in a measurement direction of the ranging sensor.

(5) The information processing apparatus according to any one of (1) to (4), in which
each of the first position information and the second position information is a coordinate value in a first coordinate axis constituting a three-dimensional coordinate system.

(6) The information processing apparatus according to any one of (1) to (5), further including
an acquisition unit for acquiring specific information for specifying the target portion acquired from a detection result of a sensor, in which
the selection unit acquires, on a basis of the acquired specific information, at least one of the first position information and the second position information.
(7) The information processing apparatus according to (6), in which
the specific information is a coordinate value of the target portion in each of a second coordinate axis and a third coordinate axis different from the first coordinate axis, the second coordinate axis and the third coordinate axis constituting the three-dimensional coordinate system.
(8) The information processing apparatus according to any one of (1) to (7), further including
an occlusion determination unit that determines, on a basis of the first position information and the second position information, presence/absence of occlusion with respect to the target portion.
(9) The information processing apparatus according to (8), in which
the occlusion determination unit determines, on a basis of the difference between the first position information and the second position information, the presence/absence of occlusion.
(10) The information processing apparatus according to (8) or (9), in which
the occlusion determination unit determines, where the difference between the first position information and the second position information is larger than a predetermined threshold value, that the occlusion has occurred.
(11) The information processing apparatus according to any one of (8) to (10), in which
the occlusion determination unit determines, where the second position information is larger than the first position information with reference to a position of the ranging sensor, that the occlusion has occurred.
(12) The information processing apparatus according to any one of (8) to (11), further including
a state determination unit that determines, on a basis of a determination result of the occlusion determination unit, state information relating to a state of the target portion.
(13) The information processing apparatus according to (12), in which
the state information includes an operation of the target portion and a shape of the target portion.
(14) The information processing apparatus according to (12) or (13), in which
the state determination unit determines the state information where it is determined that the occlusion has occurred at a predetermined feature point relating to the target portion.
(15) The information processing apparatus according to any one of (1) to (14), further including
a reliability determination unit that determines reliability of the first position information detected by the ranging sensor.
(16) The information processing apparatus according to (15), in which
the reliability determination unit determines, on a basis of the difference between the first position information and the second position information, the reliability of the first position information.
(17) The information processing apparatus according to (15) or (16), in which the selection unit selects the second position information where the reliability of the first position information is lower than a predetermined threshold value.
(18) The information processing apparatus according to any one of (1) to (17), in which
the target portion includes a hand.
(19) An information processing method executed by a computer system, including:
selecting, on a basis of a difference between first position information detected by a ranging sensor with respect to a target portion included in a body and second position information estimated by machine learning with respect to the target portion, the first position information or the second position information.
(20) A program that causes a computer system to execute the following step of:
selecting, on a basis of a difference between first position information detected by a ranging sensor with respect to a target portion included in a body and second position information estimated by machine learning with respect to the target portion, the first position information or the second position information.

REFERENCE SIGNS LIST 2 target portion
5 sensor unit
10 information processing apparatus
11 feature point estimation unit
14 reliability determination unit
15 occlusion determination unit
16 state determination unit
17 position information selection unit
100 information selection system

The invention claimed is:

1. An information processing apparatus, comprising:
a selection unit configured to select, on a basis of a difference between first position information detected by a ranging sensor with respect to a target portion included in a body and second position information estimated by machine learning with respect to the target portion, between the first position information and the second position information; and
an occlusion determination unit configured to determine, on a basis of at least one of the first position information selected on the basis of the difference or the second position information selected on the basis of the difference, presence/absence of occlusion with respect to the target portion, wherein
the selection unit and the occlusion determination unit are each implemented via at least one processor.

2. The information processing apparatus according to claim 1, wherein
the selection unit is further configured to select the second position information based on the difference between the first position information and the second position information is larger than a predetermined threshold value, and
the occlusion determination unit is further configured to determine, on a basis of the selected second position information when the difference between the first position information and the second position information is larger than the predetermined threshold value, presence/absence of occlusion with respect to the target portion.

3. The information processing apparatus according to claim 1, wherein each of the first position information and the second position information includes position information in a direction defined on a basis of a position of the ranging sensor.

4. The information processing apparatus according to claim 1, wherein
each of the first position information and the second position information includes position information in a measurement direction of the ranging sensor.

5. The information processing apparatus according to claim 1, wherein
each of the first position information and the second position information includes a coordinate value in a first coordinate axis constituting a three-dimensional coordinate system.

6. The information processing apparatus according to claim 5, further comprising
an acquisition unit configured to acquire specific information for specifying the target portion acquired from a detection result of a sensor, wherein
the selection unit is further configured to acquire, on a basis of the acquired specific information, at least one of the first position information or the second position information, and
the acquisition unit is implemented via at least one processor.

7. The information processing apparatus according to claim 6, wherein
the specific information includes a coordinate value of the target portion in each of a second coordinate axis and a third coordinate axis different from the first coordinate axis, the second coordinate axis and the third coordinate axis constituting the three-dimensional coordinate system.

8. The information processing apparatus according to claim 1, wherein the occlusion determination unit is further configured to determine, on a basis of the first position information and the second position information, the presence/absence of occlusion with respect to the target portion.

9. The information processing apparatus according to claim 8, wherein
the occlusion determination unit is further configured to determine, on a basis of the difference between the first position information and the second position information, the presence/absence of occlusion.

10. The information processing apparatus according to claim 8, wherein
the occlusion determination unit is further configured to determine, where the difference between the first position information and the second position information is larger than a predetermined threshold value, that the occlusion has occurred.

11. The information processing apparatus according to claim 8, wherein
the occlusion determination unit is further configured to determine, where the second position information is larger than the first position information with reference to a position of the ranging sensor, that the occlusion has occurred.

12. The information processing apparatus according to claim 8, further comprising
a state determination unit configured to determine, on a basis of a determination result of the occlusion determination unit, state information relating to a state of the target portion, wherein the state determination unit is implemented via at least one processor.

13. The information processing apparatus according to claim 12, wherein
the state information includes an operation of the target portion and a shape of the target portion.

14. The information processing apparatus according to claim 12, wherein
the state determination unit is further configured to determine the state information where it is determined that the occlusion has occurred at a predetermined feature point relating to the target portion.

15. The information processing apparatus according to claim 1, further comprising
a reliability determination unit configured to determine reliability of the first position information detected by the ranging sensor, wherein
the reliability determination unit is implemented via at least one processor.

16. The information processing apparatus according to claim 15, wherein
the reliability determination unit is further configured to determine, on a basis of the difference between the first position information and the second position information, the reliability of the first position information.

17. The information processing apparatus according to claim 15, wherein
the selection unit is further configured to select the second position information where the reliability of the first position information is lower than a predetermined threshold value.

18. The information processing apparatus according to claim 1, wherein
the target portion includes a hand.

19. An information processing method executed by a computer system, comprising:
selecting, on a basis of a difference between first position information detected by a ranging sensor with respect to a target portion included in a body and second position information estimated by machine learning with respect to the target portion, between the first position information and the second position information; and
determining, on a basis of at least one of the first position information selected on the basis of the difference or the second position information selected on the basis of the difference, presence/absence of occlusion with respect to the target portion.

20. A non-transitory computer-readable medium having embodied thereon a program, which when executed by a computer causes the computer to execute an information processing method, the method comprising:
selecting, on a basis of a difference between first position information detected by a ranging sensor with respect to a target portion included in a body and second position information estimated by machine learning with respect to the target portion, between the first position information and the second position information; and
determining, on a basis of at least one of the first position information selected on the basis of the difference or the second position information selected on the basis of the difference, presence/absence of occlusion with respect to the target portion.

* * * * *